June 9, 1942.  F. E. BEST  2,285,404
MEANS FOR AND METHOD OF DYNAMICALLY BALANCING ROTARY MACHINE PARTS
Filed Sept. 25, 1940  2 Sheets-Sheet 1

Frank Ellison Best,
INVENTOR.

June 9, 1942.  F. E. BEST  2,285,404
MEANS FOR AND METHOD OF DYNAMICALLY BALANCING ROTARY MACHINE PARTS
Filed Sept. 25, 1940  2 Sheets-Sheet 2

Frank Ellison Best
INVENTOR.

Patented June 9, 1942

2,285,404

UNITED STATES PATENT OFFICE 2,285,404

MEANS FOR AND METHOD OF DYNAMICALLY BALANCING ROTARY MACHINE PARTS

Frank Ellison Best, Indianapolis, Ind.

Application September 25, 1940, Serial No. 358,323

7 Claims. (Cl. 308—236)

This invention relates to means for and a method of dynamically balancing rotary machine parts and a primary object of this invention is to provide a rotary machine part which is constructed in such a manner that it may be permanently dynamically balanced by rotating it for a period of time at a speed at which the vibrations of the rotating machine part, due to dynamic unbalance, are dampened and substantially neutralized by the reactive vibrations of the supporting means for said machine part.

If a rotatable machine part which is dynamically unbalanced is mounted in a bearing and supporting stator means and rotated it will tend to vibrate or oscillate and the vibrations or oscillations thereof will be communicated to the bearing and supporting stator means, which have a natural period of vibration, while the period of vibration of the dynamically unbalanced rotating machine part will vary in proportion with the speed of rotation thereof. As the machine part is rotated at varying speeds the period of vibration thereof at certain speeds will be in consonance with the vibrations of the bearing support and the amplitude of the vibrations will be increased while for certain other speeds of rotation the vibration of the rotating machine part will be in dissonance to the vibration of the bearing and support therefor and the vibrations of the rotating part will be dampened and counteracted and substantially neutralized by the vibrations of the bearing and stator support. The vibrations of the rotating part and the stator support may be likened to sound waves in that they may reinforce each other or may substantially neutralize each other, the periods at which they tend to neutralize each other being likened to the nodes in resonance. At speeds at which the vibrations of the rotating body and the support therefor oppose each other, forces are set up which produce hammering stresses between the two parts that are not ordinarily manifested externally.

It is an object of this invention to utilize the hammering stresses set up by these opposing oscillations to deform a permanently deformable member in the rotating machine part and bring about a state of complete or improved dynamic balance therein.

A more specific object is to provide a rotating machine part having embodied therein, connecting the bearing and rotor elements, a dynamically compensating layer or sleeve of material capable of undergoing a permanent deformation to provide a shifting of the machined center when the machine part carrying said sleeve is rotated at a speed at which the vibrations due to dynamic unbalance in the rotating machine part are opposed by the vibrations set up in the supporting means.

A further object is to provide a rotating machine part having embodied therein a dynamically compensating plastic ring formed of material which will yield and permit a re-adjustment of the mass of the rotating machine part to bring about a state of complete or improved dynamic balance when the said part is subjected to high speed rotation and which will subsequently permanently set in the dynamically improved or corrected condition.

Other and more specific objects of the invention will be apparent from a study of the following description taken in connection with the accompanying drawings.

In the drawings.

Like reference numerals designate like parts throughout the several views.

Figure 1:
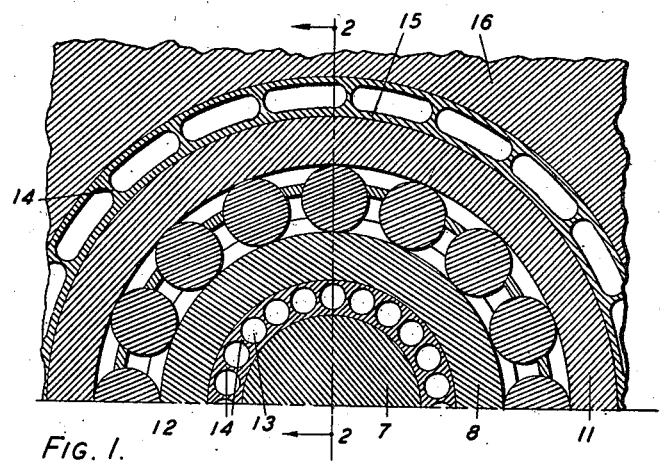
Fig. 1 is a transverse sectional view showing substantially one half of a rotary machine structure constructed in accordance with this invention.

In Figs. 1 to 6 inclusive of the drawings, I show a horizontal shaft 7, an inner race member 8, bearing rollers 9, a cage 10 for said bearing rollers, and an outer race member 11. In each form of the invention a different type of dynamically compensating sleeve is provided between the horizontal shaft 7 and the inner race member 8.

Figure 2:
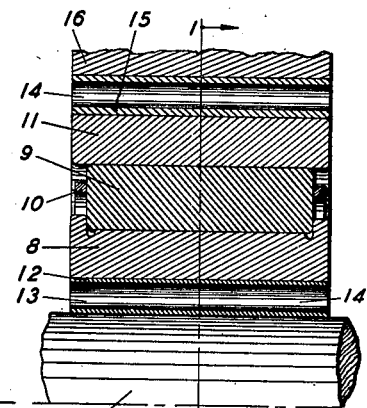
Fig. 2 is a partial longitudinal axial sectional view on broken line 2—2 of Fig. 1.

In Figs. 1 and 2, I have illustrated a dynamically compensating sleeve 12 which is made of a relatively soft metal, such as lead, copper, soft steel, or the like. This sleeve 12 is longitudinally perforated with a plurality of holes 13 which may extend throughout the length of the sleeve and are spaced apart so as to leave thin sections 14 of metal therebetween.

In these views I have also shown an additional or alternate deformable sleeve 15 positioned externally of the outer race member 11 and have shown an outer support member 16 connected with this deformable sleeve. The provision of a deformable sleeve 12 connected with the horizontal shaft 7 and another deformable sleeve 15 connected with the outer bearing or race member 11 affords an alternate construction and makes it possible to dynamically balance either the parts connected with the shaft 7 or the parts connected with the outer bearing member 11. Usually only one deformable sleeve will be provided, to wit, the one connected with the rotor or rotating parts of the device. In most instances the rotor part will be connected with the shaft 7 in which instance deformable sleeve 12 will be ordinarily used and deformable sleeve 15 may be dispensed with and part 16 may be used to support outer race member 11 directly. In adaptations, however, in which shaft 7 and inner race members 8 of Figs. 1 and 2 are used as the stator or stationary part of the structure the member 16 may be a part of the rotor or rotating member and sleeve 12 may be dispensed with, and inner race member 8 may be fitted directly to shaft 7.

When the shaft 7 together with the sleeve 12 and inner race member 8 are rotated at high speed about a horizontal or other unvertical axis any dynamic unbalance present in these rotating parts will be manifested by vibrations due to the downward thrust of gravity on the rotor thereof between each revolution. These vibrations of the rotating parts will set up vibrations in the bearing supporting parts 11—15—16, which supporting parts have an unvarying period of oscillation. By varying the speed of rotation of the rotating parts it will be found that the vibrations thereof will be amplified when they are in consonance with the vibrations of the bearing and supporting parts and will be suppressed or dampened when they are in dissonance with or opposed to the vibrations of the bearing and supporting parts. In dynamically balancing the structure the speed of the rotating parts is varied until a point is reached at which the vibrations are dampened to such an extent as to be substantially neutralized. The rotating parts are then rotated at this speed of minimum vibration for a substantial period of time. During this period the hammering forces of the opposed vibrations are exerted on the deformable sleeve and said sleeve is gradually deformed by the numerous sharp blows thereof causing the bearing axis to gradually align itself more and more with the dynamic center of the rotor until unbalance is substantially corrected and the rotating parts run practically free from vibration at any speed thereafter.

Figure 3:
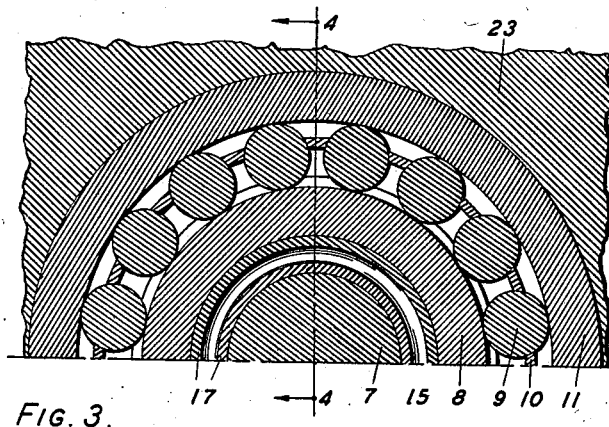
Fig. 3 is a transverse sectional view showing substantially one half of a rotary machine structure embodying a modified form of my invention.
Figure 4:
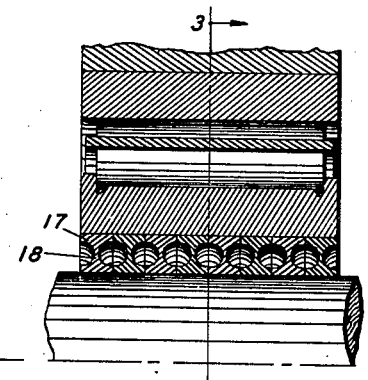
Fig. 4 is a partial longitudinal axial sectional view on broken line 4—4 of Fig. 3.

In Figs. 3 and 4 the dynamically compensating member is in the form of a plurality of rings 17 of I shaped cross section extending around the shaft 7 in side-by-side relation providing a compensating connecting member between the shaft 7 and the inner race member 8. The webs 18 of these rings are relatively thin and the rings are of relatively soft metal such as lead, copper or soft steel so that they are capable of being deformed in the same manner as the thin webs 14 of the sleeves 12 and 15 of Figs. 1 and 2 but will always be rigid enough to support the parts which they connect. These webs 14 thus permit the structure to permanently assume a dynamically balanced condition when the rotor parts 7, 17 and 8 are subjected to high speed rotation within the stator parts 11 and 23 as described in connection with Figs. 1 and 2. Obviously the shape of the rings may be varied.

Figure 5:
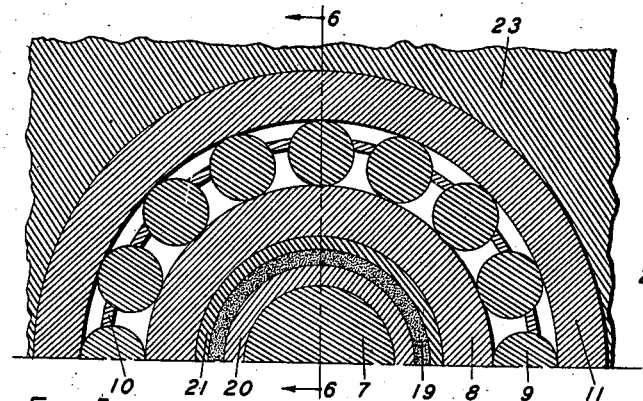
Fig. 5 is a transverse sectional view showing substantially one half of a rotary machine structure embodying another modified form of my invention.
Figure 6:
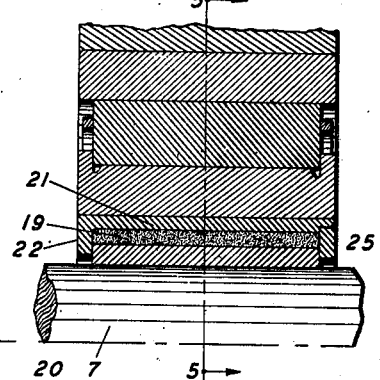
Fig. 6 is a partial longitudinal axial section taken on broken line 6—6 of Fig. 5.

In Figs. 5 and 6 the dynamically compensating member is in the form of a sleeve or layer 19 of plastic or semi-plastic material which is capable of self-adjustment to dynamically balance the structure in response to the action of the forces and stresses which act on said layer 19 when a dynamically unbalanced structure having said layer 19 therein is rotated at high speed and in dissonance with the vibrations of its supporting means. The layer 19 of plastic or semi-plastic material is preferably contained between two sleeves 20 and 21 of different diameters which have end closure means 22 and 25. The end closure means 22 and 25 are so constructed that they will retain the plastic or semi-plastic material and at the same time will prevent relative rotative and axial movements but permit relative eccentric movement of the two sleeves 20 and 21. Preferably the plastic or semi-plastic material is of a type which will set and become hard after a predetermined time, such as Portland cement, plaster of Paris, amalgam or the like that harden by chemical and/or physical change, although it may be of a semi-plastic material which does not harden, such as molder's sand, clay or the like. When a plastic material 19, capable of setting or hardening, is used, the machine part is subjected to the high speed rotary treatment while the material is plastic and this rotation at a correct speed preferably continues until the plastic material has set in the proper dynamically balanced condition. When a plastic or semi-plastic material which does not harden is used the structure may have to be rebalanced by rotation at proper speeds each time it is used or after a long period of disuse.

The outer bearing member 11, of Figs. 3, 4, 5 and 6 is connected with a suitable bearing support 23.

Figure 7:
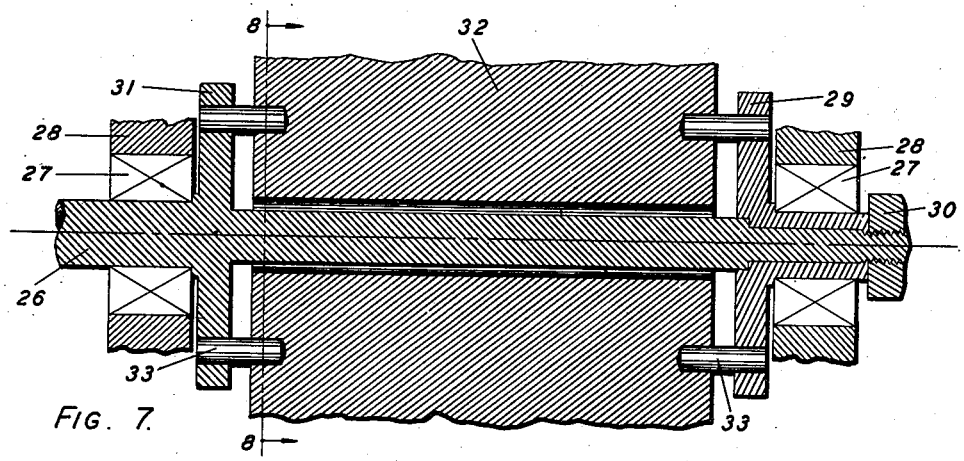
Fig. 7 is a partial longitudinal axial section of another form of my invention taken on broken line 7—7 of Fig. 8.
Figure 8:
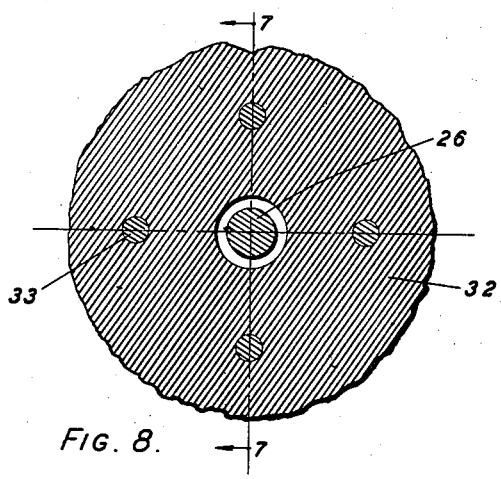
Fig. 8 is a partial transverse section taken on broken line 8—8 Fig. 7.

In Figs. 7 and 8 is illustrated another modification of my invention comprising a shaft 26 mounted by bearings 27 on stator 28. Shaft 26 in this instance, carries a flange 29 secured thereto by nut 30. Shaft 26 is also provided with a flange 31.

A rotatable machine part 32 is adjustably carried by said flanges 29 and 31, being suspended therefrom by deformable members 33 which yield under the hammering stresses between rotor and stator when rotated at a proper speed and thus become permanently deformed to bring the bearing axis more nearly coincident with the dynamic axis of said rotor, and thus improve the dynamic balance of the device.

The foregoing description and accompanying drawings clearly disclose what I now regard as preferred embodiments of my invention but it is to be understood that this disclosure is merely illustrative and that changes may be made within the scope and spirit of the following claims.

I claim:

1. A dynamically self-balancing means, comprising a rotor and a stator; bearing means mounting said rotor relative to said stator; a deformable member uniting said bearing means and said rotor, said deformable member comprising an originally soft substance capable of hardening and setting in a predetermined period of time, said substance being retained in axiswise and annular alignment by suitable means and left free to make eccentric adjustments in its soft condition in response to the dynamic reactions between rotor and stator when said rotor is rotated at speeds such that the vibrations set up by the rotation of said rotor are in dissonance with the vibrations induced in the stator thereby, and hardened and set subsequently while so rotating, thus positioning and permanently retaining the machined axis of said bearing substantially coincident with the dynamic axis of said rotor.

2. The method of dynamically balancing a dynamically unbalanced rotatable machine part comprising rotor and bearing elements joined by a number of deformable members, said method comprising the mounting of said rotatable machine part to a supporting stator element through said bearing means and rotating said machine part about an unvertical axis, such as a horizontal axis, for a substantial period of time at a speed such that the vibrations of said machine part, due to rotation under the downward pull of gravity, are in dissonance with vibrations set up in said stator element, thus distorting the said deformable member by the dynamic hammering reactions taking place between the gravitational down strokes of said rotating rotor element and the reactive vibration up strokes of said stator element and thus bringing into practical coincidence the axis of said bearing means with the dynamic axis of said rotor element.

3. The method of dynamically balancing a dynamically unbalanced rotatable machine part, said part comprising rotor and bearing elements joined by a number of non-resilient plastic members retained against undesirable adjustments in said machine part and left free to make desirable adjustments therein, said method comprising the mounting of said machine part in a stator element and the rotation of same about an unvertical axis, such as a horizontal axis, at a speed such that the vibrations of said machine part, due to rotation under the downward pull of gravity, are in dissonance with the vibrations set up in said stator element, thus moulding said plastic members in such shape as to bring the axis of said bearing elements into practical coincidence with the dynamic axis of said machine part.

4. The method of dynamically balancing a dynamically unbalanced rotatable machine part, said part comprising rotor and bearing elements joined by a number of members originally plastic and capable of hardening and setting in an interval of time, said plastic members being retained against undesirable adjustments in said machine part and left free to make desirable adjustments therein while in the plastic state, said method comprising the mounting of said machine part in a stator element and the rotation of same about an unvertical axis, such as a horizontal axis, during the hardening and setting period of said members, at a speed such that the vibrations of said machine part, due to rotation under the downward pull of gravity, are in dissonance with vibrations set up in said stator element, thus adjusting said members, while in the plastic state and holding them during the hardening and setting stage as to bring and permanently retain the axis of said bearing elements into practical coincidence with the dynamic axis of said machine part.

5. The method of dynamically balancing a dynamically unbalanced rotatable machine part which has a deformable member therein which comprises supporting said rotatable machine part in supporting and bearing means which is capable of vibration and deforming said deformable member to provide dynamic balance by rapidly rotating said machine part for a substantial period of time at a speed at which the vibration of said machine part, due to dynamic unbalance, is substantially neutralized by the vibration of the supporting and bearing means.

6. The method of providing a dynamically balanced machine part which comprises incorporating into the construction of said machine part a sleeve of deformable material, and then subjecting said machine part to high speed rotation in a vibratory support and bearing at a speed at which the vibration of said machine part, due to dynamic unbalance, is dampened and substantially neutralized by the vibration of the supporting and bearing means, whereby the hammering stresses set up by the opposing vibrations will deform said deformable sleeve and provide a correct dynamic balance.

7. The method of providing a dynamically balanced machine part, which comprises incorporating into the construction of said machine part a sleeve of plastic material capable of setting and solidifying in a time interval, and subjecting said part while said material is still plastic to high speed rotation in a vibratory support and bearing at a speed at which the vibration of said machine part, due to dynamic unbalance, is substantially in dissonance with the vibrations of the support and bearing, whereby the hammering stresses set up by opposing vibrations will shape said plastic material so as to provide a correct dynamic balance, and continuing the rotation of said machine part until the plastic material has set.

FRANK ELLISON BEST.